(12) United States Patent
Wietelmann

(10) Patent No.: US 12,176,518 B2
(45) Date of Patent: Dec. 24, 2024

(54) RECHARGEABLE LITHIUM BATTERY WITH A COMPOSITE ANODE

(71) Applicant: ALBEMARLE GERMANY GMBH, Frankfurt am Main (DE)

(72) Inventor: Ulrich Wietelmann, Friedrichsdorf (DE)

(73) Assignee: ALBEMARLE GERMANY GMBH, Frankfurt am Main (DE)

(*) Notice: Subject to any disclaimer, the term of this patent is extended or adjusted under 35 U.S.C. 154(b) by 867 days.

(21) Appl. No.: 17/272,499

(22) PCT Filed: Sep. 5, 2019

(86) PCT No.: PCT/EP2019/073687
§ 371 (c)(1),
(2) Date: Mar. 1, 2021

(87) PCT Pub. No.: WO2020/049093
PCT Pub. Date: Mar. 12, 2020

(65) Prior Publication Data
US 2021/0320291 A1    Oct. 14, 2021

(30) Foreign Application Priority Data

Sep. 5, 2018 (DE) .................... 10 2018 215 071.0

(51) Int. Cl.
| | |
|---|---|
| *H01M 4/136* | (2010.01) |
| *H01M 4/02* | (2006.01) |
| *H01M 4/04* | (2006.01) |
| *H01M 4/1397* | (2010.01) |
| *H01M 4/36* | (2006.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC ......... *H01M 4/136* (2013.01); *H01M 4/0435* (2013.01); *H01M 4/1397* (2013.01); *H01M 4/364* (2013.01); *H01M 4/505* (2013.01); *H01M 4/525* (2013.01); *H01M 4/58* (2013.01); *H01M 10/0525* (2013.01); *H01M 2004/027* (2013.01); *H01M 2004/028* (2013.01)

(58) Field of Classification Search
CPC ... H01M 10/052–0525; H01M 2004/027–028; H01M 4/136; H01M 4/0435; H01M 4/1397; H01M 4/364; H01M 4/505; H01M 4/525; H01M 4/58; Y02E 60/10
See application file for complete search history.

(56) References Cited

U.S. PATENT DOCUMENTS

| | | |
|---|---|---|
| 8,551,188 B2 | 10/2013 | Lalleman et al. |
| 9,496,552 B2 | 11/2016 | Wietelmann |
| 2010/0129718 A1 | 5/2010 | Higuchi et al. |
| 2013/0062575 A1 | 3/2013 | Wietelmann |
| 2016/0351888 A1* | 12/2016 | Wietelmann et al. ..................... H01M 4/133 |

FOREIGN PATENT DOCUMENTS

| | | |
|---|---|---|
| CN | 105895881 A | 8/2016 |
| JP | 2013503928 A | 2/2013 |
| JP | 2013524423 A | 6/2013 |
| WO | 2009101815 A1 | 8/2009 |
| WO | 2011051290 A1 | 3/2011 |
| WO | 2011121084 A1 | 10/2011 |

OTHER PUBLICATIONS

Liu, EPO machine translation of CN 105895881 A, 2016, (Year: 2016).*
Bie, Yitian et al.; "Li2O2 as a cathode additive for the initial anode irreversibility compensation in lithium-ion batteries"; Chem. Commun.; 2017; vol. 53; pp. 8324-8327.
Chandra, Dhanesh et al.; "IV.A. 1o Effect of Gaseous Impurities on Durability of Complex Li-based Hydrides for Hydrogen Storage"; DOE Hydrogen Program; FY 2009 Annual Progress Report; pp. 477-482.
Dong, Shanmu et al.; "Nanostructured transition metal nitrides for energy storage and fuel cells"; Coordination Chemistry Reviews; vol. 257; 2013; pp. 1946-1956.
Gregory H., Duncan; "Lithium Nitrides as Sustainable Energy Materials"; The Chemical Record; vol. 8; 2008; pp. 229-239.
Holtstiege, Florian et al.; "Pre-Lithiation Strategies for Rechargeable Energy Storage Technologies: Concepts, Promises and Challenges"; Batteries; vol. 4; 2018; 39 pages.
Lau, Kah Chun et al.; "Density Functional Investigation of the Thermodynamic Stability of Lithium Oxide Bulk Crystalline Structures as a Function of Oxygen Pressure"; J. Phys. Chem. C; vol. 115; 2011; pp. 23625-23633.
Liu, D.M. et al.; "Synthesis and crystal structure of a novel nitride hydride Sr2LiNH2"; Journal of Alloys and Compounds; vol. 495; 2010; pp. 272-274.

(Continued)

*Primary Examiner* — Haroon S. Sheikh
*Assistant Examiner* — Kan Luo
(74) *Attorney, Agent, or Firm* — KDW Firm PLLC

(57) ABSTRACT

The invention relates to a rechargeable lithium battery comprising a composite anode containing as the electrochemically active component one or more metal nitrogen compounds according to the general formulas (I) and/or (II)

$$Li_xM^2_z(NH)_{0.5x+z} \qquad (I)$$

$$Li_mM^2_n(NH_2)_{1+n} \qquad (II),$$

wherein (I) and (II) are present in any mixing ratio and $M^2$=an alkaline earth element or any mixture thereof, with x=0-4; z=0-2; m=1 or 0; n=1 or 0, where (m+n)=1, a separator, a cathode, containing lithium-insertable compounds selected from metal oxides, lithium metal oxides, lithium oxides and lithium hydroxide and an electrolyte, the electrochemically active component of the composite anode being embedded in a transition metal-containing electronically or mixed-conductive network.

15 Claims, No Drawings

(56) References Cited

OTHER PUBLICATIONS

Lu, Jun et al.; "Aprotic and Aqueous Li-O2 Batteries"; Chemical Reviews; vol. 114; 2014; pp. 5611-5640.

Michel, Kyle J. et al.; "First-Principles Study of the Li—Mg—N—H System: Compound Structures and Hydrogen-Storage Properties"; J. Phys. Chem.C; vol. 113; 2009; pp. 14551-14558.

Sun, Yongming et al.; "High-capacity battery cathode prelithiation to offset initial lithium loss"; Nature Energy; vol. 1; Jan. 2016; Article No. 15008; 7 pages.

Wardinsky, Michael D. et al.; Investigation Of Lithium Peroxide As The Positive Electrode Material In A Solid-State Thin-Film Lithium Battery; Department of Chemical Engineering, Brigham Young University 350 CB Provo, Utah; Electrochem. Soc.; 1993; (pp. 93-23) (Proc. Symp. New Sealed Rech. Batt. and Supercapacitors); pp. 389-400.

Weidner, Eveline et al.; "Hydrogenation Reaction Pathway in Li2Mg(NH)2"; J. Phys. Chem. C; vol. 113; 2009; pp. 15772-15777.

Wietelmann, Ulrich et al.; "Hydrides"; Ullmann's Encyclopedia of Industrial Chemistry; A13, 2016, Wiley-VCH, Weinheim; 39 pages.

Yang, Minghui et al.; "Template-Free Synthesis of Mesoporous Transition Metal Nitride Materials from Ternary Cadmium Transition Metal Oxides"; Chemistry of Materials; vol. 24; 2012; pp. 4406-4409.

Zhong, Yu et al.; "Transition Metal Carbides and Nitrides in Energy Storage and Conversion"; Advanced Science; 2016; vol. 3; Article 1500286; 28 pages.

Zhu, Zhi et al.; "Anion-redox nanolithia cathodes for Li-ion batteries"; Nature Energy; Jul. 25, 2016; Article No. 16111; 7 pages.

Weast, R.C., ed., CRC Handbook of Chemistry and Physics, 63rd edn., Boca Raton: CRC Press, Inc., 1982, p. D-163.

\* cited by examiner

RECHARGEABLE LITHIUM BATTERY WITH A COMPOSITE ANODE

CROSS-REFERENCE TO RELATED APPLICATIONS

This application is a National Stage of International Application No. PCT/EP2019/073687, filed on Sep. 5, 2019, which application claims priority from German Patent Application No. 10 2018 215 071.0, filed Sep. 5, 2018. Each patent application identified above is incorporated here by reference in its entirety.

FIELD

The invention relates to a rechargeable lithium battery with a composite anode containing as electrochemically active component in the composite anode a metallic nitrogen compound, a cathode separated therefrom by a separator and containing lithium-insertable compounds and an aprotic lithium electrolyte.

PRIOR ART

The operating principle of commercial rechargeable lithium-ion batteries is based on an insertion mechanism: both the negative electrode (anode) and the positive electrode (cathode) are made of materials that are able to incorporate (insert) lithium ions without fundamental changes to the microstructure. While the anode material is a carbon-based material—graphite or hard carbon—the cathode active materials are transition metal oxides. The transition metals in the latter oxides are redox active, i.e. they change their oxidation state during charging or discharging, respectively. This is illustrated by the following exemplary reaction:

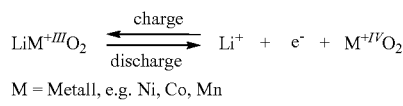

M = Metall, e.g. Ni, Co, Mn

With the currently used cathode materials, the oxidation state of the redox-active metal centers is only changed by one step when charging/discharging the battery. In the above case, the oxidation state changes between +III and +IV. For this reason, the capacity of the cathode materials is relatively low. In the case of the classical cathode material $LiCoO_2$, the theoretical capacitance is 274 mAh/g, of which only about 135 mAh/g can be used in practice. The graphitic material used for the anode also has a relatively low capacitance of 372 mAh/g for the limit of stoichiometry $LiC_6$. Consequently, the theoretical energy density for the graphite (Ce)/$LiCoO_2$ system is also unsatisfactorily low, at about 380 Wh/g. A further disadvantage of lithium ion batteries is that the cathode materials used are predominantly metals such as cobalt and nickel, which are not readily available. It is feared that these metals are not available in sufficient quantities to ensure a comprehensive supply of lithium batteries for global electromobility and stationary energy storage.

The much higher storage capacitance of lithium metal (3860 mAh/g), which is an alternative to graphite, cannot be used in practical batteries for anode production because such batteries are neither safe nor cycle stable. During cycling, the lithium metal is sometimes not deposited in a planar form, but in the form of needle-shaped growths (dendrites). These dendrites can lose physical contact with the metal anode, causing the electrochemical cell to lose capacitance. The consequences are even more serious when such spiky dendrites penetrate the separator. This can short-circuit the battery cell with often catastrophic consequences: thermal run-away, opening of the battery case and possible ignition of the escaping gases.

Efforts are therefore being made to use lithium alloys as anode material instead of pure lithium metal. However, lithium alloys show extremely strong volume fluctuations during lithium insertion and removal (sometimes several 100%, e.g. $Li_9Al_4$: 238%). Therefore, alloy anodes, with the exception of tin graphite composites, have not been able to establish themselves on the market so far. Tin is toxic and a rare and expensive element, which prevents the widespread use of materials containing tin.

As an alternative to cation redox-active positive electrode materials, open battery systems are being investigated. These contain a porous structure open to the environment, mostly consisting of carbon, whose surface is coated with a catalyst containing precious metals so that diffused oxygen can be bound to lithium oxides (oxygen reduction reaction):

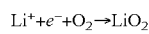

In the initially formed product—lithium peroxide ($LiO_2$)—the oxygen has an average oxidation number of −0.5. Further uptake of lithium produces lithium peroxide ($Li_2O_2$) with an oxygen oxidation number of −1. The latter lithium oxide can be converted back into lithium and elemental oxygen in the presence of a metal catalyst that catalyzes oxygen oxidation by reversing the formation reaction:

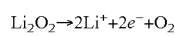

The disadvantage is that the air electrode described above has only a very low power density and, above all, only very limited reversibility, so that this cathode shape is still far from being used in commercial batteries. In addition, there is a strong gap of typically 0.5-1 V between charge and discharge potential, so that the energy efficiency ("round trip efficiency") is completely unsatisfactory. The currently insurmountable technical challenges lead to the expectation that commercialization of the Lithium/air battery will take place in 10-20 years at the earliest. For an overview see K. Amine et al., Chem. Reviews 2014, 5611-40, 114.

PROBLEM TO BE SOLVED

The problem to be solved by the invention is to provide a lithium battery with a high energy density of 500 Wh/kg or more and a good safety characteristic, without a Li-metal anode. Furthermore, active materials with the lowest possible content of rare or poorly available metals shall be used.

SOLUTION OF THE PROBLEM

The problem is solved by a rechargeable lithium battery with a composite anode (negative electrode) containing a metal nitrogen compound as electrochemically active component, according to the general formulas (I) and/or (II)

where (I) and (II) are present in any mixing ratio and $M^2$=an alkaline earth element selected from the group consisting of Mg, Ca, Sr, Ba, or any mixture thereof, with x=0-4; z=0-2;

m=1 or 0; n=1 or 0, wherein (m+n)=1, and wherein they correspond to the fully discharged, lithium-poorest state of charge of the metallic nitrogen compounds, a cathode separated therefrom by a separator (positive electrode) containing lithium insertable compounds selected from metal oxides, lithium metal oxides, lithium oxides and lithium hydroxide as well as an aprotic lithium electrolyte, wherein the electrochemically active metal nitrogen compounds of the composite anode are embedded in a transition metal-containing electronically or mixed-conductive network consisting of finely divided transition metals and/or electronically or mixed-conductive interstitial transition metal compounds, and the weight ratio between the components forming the network and the nitrogen-containing compounds I and/or II is in the range of 1:100 to 1:2.

For the purposes of the present invention, an electronically or mixed-conductive network is understood to be a purely electronically conductive material or a material which is both ionic and electronically conductive. In the fully charged, lithium-richest state of the metallic nitrogen compounds, they correspond to the general formulas (III) and/or (IV)

$$Li_{2z+x}M^2_z(NH)_{0.5x+z} \quad (III)$$

$$Li_3N \cdot n(LiM^2N) \cdot (4-2m)LiH \quad (IV),$$

where (III) and (IV) are present in any mixing ratio and $M^2$=alkaline earth element (Mg, Ca, Sr, Ba or any mixture thereof)

x=0-4; z=0-2 m=1 or 0; n=1 or 0, wherein (m+n)=1.

For the cathode, cathode materials can be used whose electrochemical potential exceeds a value of about 2 V vs Li/Li+. Preferred applications are nanoparticulate lithium oxygen compounds selected from lithium hydroxide (LiOH), lithium oxide ($Li_2O$), lithium peroxide ($Li_2O_2$) and lithium superoxide ($LiO_2$) embedded in an electronic or mixed-conductive network. If LiOH is used, the cathode contains additional lithium hydride (LiH) at least after initial charging.

The rechargeable lithium batteries according to the invention have a high reversible storage capacitance without the need to use metallic lithium or a material capable of being alloyed with lithium (e.g. tin, silicon or aluminum) as an anode. The functional principle of the electrochemical active anode materials according to the invention is explained in the following.

The general anode half reactions during charge/discharge of a galvanic cell containing nitrogenous active materials of the invention correspond to at least one of the two following equations:

$$LiM^2_7(NH)_{0.5x+z} + 2zLi^+ + 2ze^- \rightleftharpoons Li_{2z+x}M^2_z(NH)_{0.5x+z} \quad (1)$$

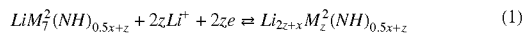

$$Li_mM^2_n(NH2)_{1+n} + (4m+2n)Li + +4/ye^- \rightleftharpoons$$
$$Li_3N \cdot n(LiM^2N) \cdot (2m+4n)LiH \quad (2)$$

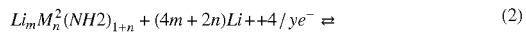

In order to achieve a particularly high specific capacitance, it is preferred that $M^2$ has the lowest possible atomic mass, i.e. $M^2$ is preferably magnesium (Mg) or calcium (Ca) or a mixture thereof.

Preferably the galvanic element in the discharged (low lithium) state contains as active anode material according to generic formula (I) one or more of the following compounds: $Li_2NH$, $MgNH$, $CaNH$, $Li_2Mg(NH)_2$, $Li_2Ca(NH)_2$, $MgCa(NH)_2$, $Li_4Mg(NH)_3$, $Li_2Mg_2(NH)_3$ and/or according to generic formula (II) one or more of the following compounds: $LiNH_2$, $Ca(NH_2)_2$ or $Mg(NH_2)_2$.

If the galvanic cell according to the invention is charged by applying an external voltage, the active N-containing anode materials change into a lithium-rich state. When fully charged, the lithium-rich compounds are formed according to the generic formulae (III), preferably: $Li_4NH$, $Li_2CaNH$, $Li_2MgNH$, $Li_6Mg(NH)_2$, $Li_6Ca(NH)_2$, $Li_4MgCa(NH)_2$, $Li_{10}Mg(NH)_3$, $Li_8Mg_2(NH)_3$ and/or according to the generic formula (IV), preferably: $Li_3N$, CaLiN, MgLiN and LiH.

The imide compounds containing more than one metal can be phase pure compounds such as those of the type $Li_4M^2(NH)_3$ or $Li_2M^2_2(NH)_3$ ($M^2$=Mg, Ca, Sr or Ba) or physical mixtures of the corresponding monometallic compounds. For example, $Li_4Mg(NH)_3$, formally a mixture of $Li_2Mg(NH)_2$ and $Li_2NH$ (see K. J. Michel, A. R. Akbarzadeh, V. Ozolins, J. Phys. Chem. C. 2009, 113, 14551-8) and $Li_2Mg_2(NH)_3$, a mixed compound of $Li_2Mg(NH)_2$ and MgNH (see E. Weidner et al., J. Phys. Chem. C 2009, 113, 15772-7), known from literature.

The electrochemical redox half reactions for four exemplary compounds of the generic formula (I) can be described as follows:

$$Li_2NH + 2Li^+ + 2e^- \rightleftharpoons Li_4NH \quad (3a)$$

and $$MgNH + 2Li^+ + 2e^- \rightleftharpoons Li_2MgNH \quad (3b)$$

and $$Li_2M^2(NH)_2 + 4Li^+ + 4e^- \rightleftharpoons Li_6(NH)_2 (M^2 = Mg, Ca) \quad (3c)$$

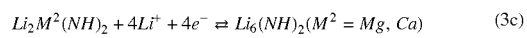

and $$MgCa(NH)_2 + 4Li^+ + 4e^- \rightleftharpoons Li_4MgCa(NH)_2 \quad (3d)$$

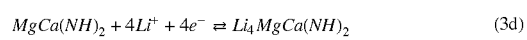

The theoretical capacitances for the seven particularly preferred anode systems listed above are calculated in relation to the discharged (low lithium) form as follows:

TABLE 1

Theoretical electrochemical capacitances of selected nitrogen-containing anode active materials

| Anode material (low lithium form, generic formulas (I) and (II)) | Formula mass (g/mol) | maximum lithium absorption capacitance (eq per formula unit) | theoretical capacitance (Ah/kg) |
|---|---|---|---|
| $Li_2NH$ | 28.88 | 2 | 1854 |
| MgNH | 39.31 | 2 | 1364 |
| $Li_2Mg(NH)_2$ | 68.13 | 4 | 1574 |
| $Li_2Ca(NH)_2$ | 77.02 | 4 | 1392 |
| $MgCa(NH)_2$ | 94.38 | 4 | 1136 |
| $Li_4Mg(NH)_3$ | 97.07 | 6 | 1657 |
| $Li_2Mg_2(NH)_3$ | 107.49 | 6 | 1496 |
| $LiNH_2$ | 28.88 | 4 | 4673 |

All anode materials according to the generic formulae (I) and (II), which are particularly preferred, therefore have at least three times the theoretical capacitance compared to the prior art (graphite).

In addition to the compounds with the general formulas (I) to (IV) described above, nitride hydrides of the general composition $M^2{}_2LiNH_2$ with $M^2$=Mg, Ca, Sr, Ba or any mixture thereof can be used. A typical example is $Sr_2LiNH_2$ (see D. M. Liu, Q. Q. Liu, T. Z. Si, Q. A. Zhang, Journal of Alloys and Compounds, 495, 9 Apr. 2010, 272-274), which can be used in the inventive sense as a high-capacitance, lithium nitrogen-based anode material.

Lithium amide has the highest lithium absorption capacitance of the low lithium anode active materials (see Table 1). The specific electrochemical capacitance can therefore be increased by using a mixture of lithium amide with anode materials according to generic formula (I). For example, when using a 1:1 mixture of lithium amide and lithium imide, $Li_2NH$, a theoretical specific capacitance of the mixed anode material of 3103 Ah/kg is obtained. The electrochemical half reaction of the mixture is described by the following equation:

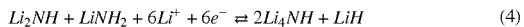

$$Li_2NH + LiNH_2 + 6Li^+ + 6e^- \rightleftharpoons 2Li_4NH + LiH \quad (4)$$

The addition of $LiNH_2$ can be achieved by mixing the pure components; however, it is also possible to synthesize a structurally uniform mixed phase $Li_{2-x}NH_{1+x}$, for example by hydrogenating $Li_3N$ to the desired H content (see D. Chandra et al., DOE Hydrogen Program, F Y 2009 Ann. Prog. Rep. 477-482).

The lithium nitrogen-based anode active materials can be produced according to the synthesis methods listed in the patent documents WO 2011/051290 A1 and WO 2011/121084 A1 respectively.

The use of lithium nitrogen compounds according to the generic formulas (I), (II), (111) and (IV) as high-capacitance anode materials is known from the patents WO 2011/051290 A1 and WO 2011/121084 A1 respectively. However, both patents specifically state that battery anodes produced with these materials should not contain any transition metals. WO 2011/051290 A1 additionally describes "transition metal free lithium nitrogen compounds of the formula $Li_oNH_{3-o}$, where o=1, 2 or 3".

Although WO 2011/121084 A1 does not explicitly mention the absence of transition metals in the anode, there is no indication of a possible presence of transition metals or transition metal compounds in the negative mass (anode).

The inventors have found that lithium nitrogen compounds according to the general generic formulas (I)-(IV) when used as anode materials according to the technical teachings of WO 2011/051290 A1 and WO 2011/121084 A1, have a very low electrochemical capacitance and an almost non-existent reversibility when a galvanic cell produced with them is tried to be cyclized.

It has now been found surprisingly that the electrochemical activity and cyclizability can be significantly increased by adding finely divided transition metal powders and/or finely divided conductive transition metal compounds with an electrochemical potential of <2.5 V against Li/Li+. It is important to ensure the closest possible contact between the lithium nitrogen-based anode material and the finely dispersed transition metal powder or conductive transition metal compound, respectively. It is also advantageous if the lithium nitrogen compounds, characterized by the generic formulae (I)-(IV) and the transition metal powders as well as the electronically or mixed conductive transition metal compounds with an electrochemical potential of <2.5 V against Li/Li$^+$ are present in the finest possible divided, amorphous or nanoparticulate form. The exact dimensions of the preferred nanoparticulate impression depend on the mechanical form factor (i.e. the three-dimensional shape of the particles). In case of spherical (or similar) particle shapes, these are 0.1-100 nm, preferably 1-30 nm. The electronic conductivity of the finely divided transition metal powders and/or finely divided conductive transition metal compounds with an electrochemical potential of <2.5 V against Li/Li$^+$ is at least $10^{-7}$ S/cm at room temperature, preferably at least $10^{-6}$ S/cm and particularly preferably at least $10^{-5}$ S/cm.

The transition metal powders M are preferably the elements of the 3rd to 12th group of the periodic table of the elements, especially preferred M=Sc, Ti, Zr, Hf, V, Cr, Mo, W, Mn, Fe, Co, Ni, Cu, Ag, Zn as well as the rare earth metals La, Ce, Pr, Nd, Sm, Gd, Dy, $H_o$, Er, Tm, Yb and Lu or any mixture of the mentioned transition metals.

Electronically conductive interstitial compounds are used as transition metal compounds with an electrochemical potential of <2.5 V against Li/Li+. These are preferably transition metal nitrides (nitridometallates) and/or transition metal carbides with M=a metal of the 3rd to 12th group of the periodic table of the elements and/or transition metal hydrides with M=a metal of the 3rd to 10th group of the periodic table of the elements. Binary ($MN_x$, $MC_x$, $MH_x$) as well as ternary ($MM'_yN_x$; $MM'_yC_x$; $MM'_yH_x$) and higher mixed phases can be used, whereby the further metal M' is at least one further transition metal from the 3rd to 12th group of the periodic table of the elements ($MxM'_yN_z$) and/or the element lithium ($Li_yMN_x$; $Li_yMC_x$; $Li_wM,M'_yN_z$; $Li_wM,M'_yH_z$; etc.). Where: w, y=0 to 8; x=0.5 to 1; z=0 to 3.

Nanoparticulate nitridometallates can be produced, for example, by grinding crystalline precursors using high-energy mills (planetary ball mills) (D. H. Gregory, The Chemical Record, Vol. 8, 229-239, 2008). They can also be produced by other physical processes such as physical vapor deposition, plasma and laser methods or by chemical processes. The chemical processes usually start from the elementary metals or corresponding compounds (oxides, hydrides etc.) and involve reactions with nitrogen sources such as ammonia, cyanamide, urea or gaseous nitrogen, usually at high temperatures (S. Dong et al., Coordination Chem. Reviews 257 (2013) 1946-56). Highly conductive nanoporous transition metal nitrides can be produced, for example, by ammonolysis of Zn and Cd containing oxide precursors (M. Yang, J. DiSalvo, Chem. Materials 2012, 24, 4406-9). In particular, the following transition metal nitride compounds are preferred: $TiN_n$, $ZrN_n$, $HfN_n$, $VN_n$, $NbN_n$, $TaN_n$, $CrN_n$, $MoN_n$, $WN_n$, $MnN_n$, $FeN_n$, $CoN_n$, $NiN_n$, $ZnN_n$; $Cr_{1-n}Fe_nN$, wherein n=0.3 to 1, and $Li_7MnN_4$; $LiMoN_2$; $Li_{2.6}Co_{0.2}Cu_{0.15}Fe_{0.05}N$; $Li_{2.7}Fe_{0.3}N$; $Li_3FeN_2$; $Li_{2.5}Co_{0.2}Cu_{0.1}Ni_{0.1}N$; $Li_{2.6}Co_{0.2}Cu_{0.2}N$; $Li_{2.6}Co_{0.4}N$.

Transition metal carbides can be produced by carbothermic reduction, coreduction processes, hydrothermal processes, sol-gel processes and CVD processes. Nanoparticulate carbides with 1D or 2D morphologies are generally synthesized by template processes (Y. Zong, Adv. Sci. 2016, 3, 1500286). Especially preferred are the following transition metal carbide compounds: TiC, WC; $ZrC_{1-m}$, $HfC_{1-m}$, $VC_{1-m}$, $NbC_{1-m}$, $TaC_{1-m}$, $Cr_3C_2$, $Mo_2C$, $Fe_3C$, wherein m=0 to 0.5.

Transition metal hydrides are generally produced by hydrogenation of the underlying metals, usually at elevated temperatures and elevated hydrogen pressures (U. Wietelmann, M. Felderhoff, P. Rittmeyer, in: UII mann's Encyclopedia of Industrial Chemistry, "Hydrides", A13, 2016, Wiley-VCH, Weinheim). The following transition metal hydride compounds are particularly preferred: $ScH_2$, $YH_o$, $LaH_o$, $CeH_2$, $PrH_o$, $NdH_o$, $SmH_o$, $EuH_o$, $GdH_o$, $TbH_o$, $DyH_o$, $HoH_o$, $ErH_o$, $TmH_o$, $YbH_o$, $LuH_o$, $TiH_2$, $ZrH_2$, $HfH_2$, $VH$, $VH_2$, $TaH_{0.5}$, $MnH$, wherein o=2 or 3.

The above mentioned transition metal compounds with the qualitative composition $Li_wM_xM'_yE_z$ (E=N, C, H; w, y=0 to 8; x=0.5 to 1; z=0 to 3) belong to the group of the so-called interstitial metal compounds or alloys, i.e. the embedded foreign elements E, i.e. carbon, nitrogen as well as hydrogen, are arranged on interstitial layers (interstitial sites) of the underlying metal lattice. The given stoichiometries indicate the highest content(s) (limit stoichiometries) of carbon, nitrogen and hydrogen respectively. However, the interstitial compounds are not exactly stoichiometric compounds, i.e. all compositions starting from pure metal up to the specified limit stoichiometry are usually possible and mostly stable. All compounds with lower contents of foreign elements, i.e. qualitatively represented by $Li_wM_xM'_yE_{z-\delta}$ ($\delta$ can take any value between 0 and z) are also electronically or mixed conducting materials and therefore suitable for the production of composite anodes with nitrogenous active materials according to the invention.

According to the invention, nanoparticulate, electronically conductive transition metals and/or their likewise nanoparticulate nitride, carbide or hydride compounds are mixed as homogeneously as possible with the likewise nanoparticulate lithium nitrogen-containing anode material by a physical mixing process, whereby a good contacting of the individual particles is ensured by subsequent pressing (in the case of technical-commercial production, calendering) during anode strip production and the fully functional composite anode containing nitrogen and transition metal is obtained. Composite anode materials according to the invention can also be produced by chemical processes, e.g. reactions with nitrogen sources. The preferred nitrogen sources are elementary nitrogen ($N_2$); ammonia ($NH_3$); hydrazine ($N_2H_4$); urea ($CH_4N_2O$). In ammonolysis with $NH_3$, the metals, i.e. lithium and the corresponding transition metals, are reacted with ammonia at preferably elevated temperatures and under pressure. The amide compounds obtained can then be further converted by subsequent thermolysis, e.g. into imide compounds and/or nitrides. If non-nitridic conductivity improvers are desired, corresponding transition metal hydrides and/or transition metal carbides (selection: see above) can be added before or after the ammonolysis. After removal of excess ammonia the remaining solids can be ground together. This measure causes a particle size reduction and an improvement of the contacting. During the reaction with nitrogen at mostly increased temperatures and pressures, nitridic phases are formed immediately. Also in this case, desired non-nitridic conductivity enhancers can be added.

In a preferred embodiment of the invention, the lithium nitrogen-containing anode materials according to the invention are co-milled with the conductivity improving-transition metals or their nitrides, carbides or hydrides. A high-energy mill, for example of the type of a planetary ball mill, is used for the grinding.

Other materials that improve the functionality of the anode can be added to the nitrogen-containing composite anode materials according to the invention. These include, above all, non-metal-based conductivity improvers, lithium-donating additives and binders. All conductive forms of elemental carbon (graphite, carbon blacks, graphene, carbon nanotubes) can be used as non-metal-based conductivity enhancers. Lithium metal (preferably coated, i.e. surface passivated and in powder form or as thin foil) or lithium-rich compounds such as lithium graphite ($LiC_{6-\delta}$, $\delta$=0-5) or coated lithium silicides ($Li_nSiO_x$@$Li_2O$, n=0.5-4.4; x=0-1) can be used as lithium-donating additives. The organic polymers commonly used for electrode production can be used as binders. These include PTFE, PVdF, polyisobutylene (e.g. Oppanole® from Company BASF) and similar materials.

In the composite anode material containing nitrogen and transition metal according to the invention, the weight ratio between the finely divided transition metal and the electronically or mixed-conductive transition metal compound $Li_wM_xM'_yE_z$ (E=N, C, H: w, y=0 to 8: x=0.5 to 1: z=0 to 3) on the one hand and the nitrogen-containing electrochemically active nitrogen-containing anode material on the other hand is in the range from 1:100 to 1:2. Preferably it is in the range from 1:50 to 1:5.

The finished composite anode containing nitrogen and transition metal in accordance with the invention may additionally contain other conductivity improvers (0 to 30 wt %), binders (0 to 20 wt %) and/or prelithizers (0 to 20 wt %).

The composite anode materials containing nitrogen and transition metal according to the invention can in principle be used for the production of rechargeable lithium cells with any counter-electrodes. However, the electrochemical potential of the cathode active materials used should be at least 2.0 V, preferably at least 2.5 V vs. the $Li/Li^+$ reference electrode. The cathode materials that can be used include in particular lithiated metal oxide insertion materials, preferably layer-structured compounds such as $LiCoO_2$, $LiNiO_2$, $Li(Ni,Mn,Co)O_2$, $LiNi_{0.80}Co_{0.15}Al_{0.05}O_2$ as well as spinel-structured materials such as $LiMn_2O_4$ and $LiNi_{0.5}Mn_{1.5}O_4$ and also those with an olivine structure such as $LiFePO_4$ and $LiMnPO_4$. Non-lithiated metal insertion compounds such as electrolytic manganese dioxide ($MnO_2$) or vanadium oxides ($V_2O_3$) can also be used. The chemical formulas listed above indicate the ideal composition of the basic compounds. In practice, however, these are used in slightly or more modified form. These include materials with structure-stabilizing dopants (e.g. Al stabilized Li-Nickel Cobalt oxide, "NCA") or compounds doped with foreign metals or non-metals to increase conductivity. Such variants of the parent compounds modified by doping can also be used according to the invention. In terms of the invention, it is also possible to use mixtures of different cathode materials.

The use of a positive electrode (cathode) is preferred, the electrochemical mixed active component of which is replaced by at least one anion redox active material in the form of a lithium oxygen compound selected from: lithium hydroxide (LiOH), lithium oxide ($Li_2O$), lithium peroxide ($Li_2O_2$) and lithium superoxide ($LiO_2$).

The general cathode half reactions during charge/discharge of the galvanic cells of the invention using the preferred anion redox active materials satisfy at least one of the following equations:

$$LiOH + 2Li^+ + 2e^- \rightleftarrows Li_2O + LiH \quad (5)$$

$$LiO_2 + Li^+ + e^- \rightleftarrows Li_2O_2 \quad (6)$$

$$Li_2O_2 + 2Li^+ + 2e^- \rightleftarrows 2Li_2O \quad (7)$$

$$LiO_2 + 3Li^+ + 3e^- \rightleftarrows 2Li_2O \quad (8)$$

The preferred cathode materials used have—compared to the theoretical capacitance of $LiCoO_2$, for example—a capacitance at least 4 times higher.

TABLE 2

Theoretical electrochemical capacities of the preferred anion redox active cathode materials

| Cathode material (low lithium form) | Formula mass (g/mol) | max. Lithium absorption capacity (eq per formula unit) | theoretical capacitance (Ah/kg) |
|---|---|---|---|
| $Li_2O$ | 29.88 | 1.5 | 1345 |
| $LiO_2$ | 38.94 | 1 | 688 |
| $Li_2O_2$ | 45.88 | 2 | 1168 |
| LiOH | 23.94 | 2 | 2239 |

Since all lithium oxygen compounds mentioned are electronic insulators, they must be present in finely divided (amorphous or nanoparticulate) form and the individual particles must be contacted by means of an electronically or mixed conductive network. Conductive finely divided metals as well as many metal oxides and lithium metal oxides can be used for this purpose. Such systems are well known in literature and only exemplary embodiments are mentioned here. Lithium peroxide, $Li_2O_2$, can be contacted and cathodically completely decomposed by co-milling with mixed conductive $LiNi_{0.33}Co_{0.33}Mn_{0.33}O_2$ (Y. Bie et al., Chem. Commun. 2017, 53, 8324-7). Composites consisting of a mixture of Co-metal and $Li_2O$, both in nanoparticulate form, can also be cathodically completely decomposed (Y. Sun, Nature Energy, January 2016, 15008). For the purposes of the present invention, the charging voltage should not exceed a certain level at which oxygen evolution begins. For lithium oxides this voltage is about 3-3.5 V vs $Li/Li^+$. The practical functionality of a battery full cell containing nanoparticulate lithium oxides (a mixture of $Li_2O$, $Li_2O_2$ and $LiO_2$) embedded in a matrix of $Co_3O_4$ is known (Z. Zhi, Nature Energy, 25 Jul. 2016, 16111).

As electrolytes for the anion-redox battery with nitrogen and transition metal containing composite anode, the types of electrolytes (liquid, gel, polymer and solid electrolytes) that are familiar to the specialist are suitable. As conducting salt for liquid, polymer and gel-polymer systems, soluble lithium salts with weakly coordinating, oxidation-stable anions are used in the matrix used. These include $LiPF_6$, lithium fluoroalkyl phosphates, $LiBF_4$, imide salts (e.g. $LiN(SO_2CF_3)_2$), $LiOSO_2CF_3$, methide salts (e.g. $LiC(SO_2CF_3)_3$), $LiClO_4$, lithium chelatoborates (e.g. $LiB(C_2O_4)_2$, called "LiBOB"), lithium fluorochelatoborates (e.g. $LiC_2O_4BF_2$, called "LiDFOB"), lithium chelatophosphates (e.g. $LiP(C_2O_4)_3$, called "LiTOP") and lithium fluorochelatophosphates (e.g. $Li(C_2O_4)_2PF_2$). Salts with anions that are stable against anion dissociation and that are fluorine-free are particularly preferred.

Solid state electrolytes, i.e. Li-ion conductive glasses, ceramics or crystalline inorganic solids are also particularly preferred. Examples of such materials are: lithium thiophosphates, (e.g. $Li_3PS_4$), argyrodites ($Li_6PS_5X$ with X=nCl, Br, I), phosphidosilicates (e.g. $Li_2SiP_2$), nitridophosphates (e.g. $Li_{2.9}PO_{3.3}NO_{0.36}$), nitridoborophosphates (e.g. $Li_{47}B_3P_{14}N_{42}$), metal sulfido phosphates (e.g. $Li_{10}GeP_2S_{11}$), garnets (e.g. $Li_7La_3Zr_2O_{12}$), titanium phosphates ($Li_{1.5}Al_{0.5}Ti_{1.5}(PO_4)_3$) and boron hydride compounds (e.g. $LiBH_4$, $Li_2B_{12}H_{12}$).

The composite anode materials containing nitrogen and transition metal in accordance with the invention can be used to construct a galvanic cell in accordance with the invention. Depending on the type of counter-electrode (cathode), they can be used either in (partially) lithium-charged or (partially) discharged (delithiated) form. While the delithiated anode form is used with a lithium-charged cathode material, the opposite is true for the lithiated anode form. This will be explained below using a few examples:

Thus, the delithiated anode form, for example lithium imide ($Li_2NH$), can be used against a lithium-rich cathode material, which is preferably at least one of the following compounds selected from $Li_2O$ and $Li_2O_2$, in an electrochemical cell The electrochemical redox reactions then look as follows:

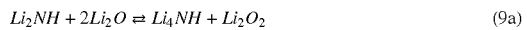
$$Li_2NH + 2Li_2O \rightleftharpoons Li_4NH + Li_2O_2 \tag{9a}$$

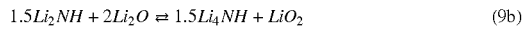
$$1.5Li_2NH + 2Li_2O \rightleftharpoons 1.5Li_4NH + LiO_2 \tag{9b}$$

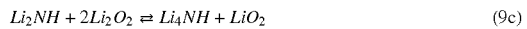
$$Li_2NH + 2Li_2O_2 \rightleftharpoons Li_4NH + LiO_2 \tag{9c}$$

On the other hand, a lithium-rich form of the preferred anode material, for example $Li_2MgNH$ or $Li_4NH$, is suitable as a counter electrode for a lithium-poor form of the cathode material of the invention (e.g. LiOH, $LiO_2$). However, lithium peroxide can also be used, which, in combination with lithium-rich anode materials, can receive additional lithium. Lithium peroxide with a medium lithium content can therefore be used in combination with both lithium-rich and lithium-poor anode active materials. The electrochemical reactions can be formulated as follows:

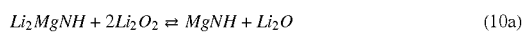
$$Li_2MgNH + 2Li_2O_2 \rightleftharpoons MgNH + Li_2O \tag{10a}$$

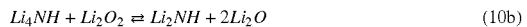
$$Li_4NH + Li_2O_2 \rightleftharpoons Li_2NH + 2Li_2O \tag{10b}$$

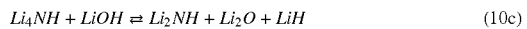
$$Li_4NH + LiOH \rightleftharpoons Li_2NH + Li_2O + LiH \tag{10c}$$

When using lithium amide, for example, the charge and discharge reactions are as follows:

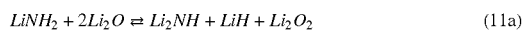
$$LiNH_2 + 2Li_2O \rightleftharpoons Li_2NH + LiH + Li_2O_2 \tag{11a}$$

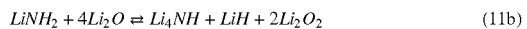
$$LiNH_2 + 4Li_2O \rightleftharpoons Li_4NH + LiH + 2Li_2O_2 \tag{11b}$$

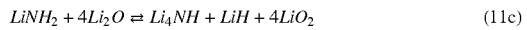
$$LiNH_2 + 4Li_2O \rightleftharpoons Li_4NH + LiH + 4LiO_2 \tag{11c}$$

When using a partially lithiated form of the anode material, a sufficient amount of the cathode material for lithium reception is used either in a likewise partially lithiated form or as a mixture of separate particles in lithium-loaded and discharged form. This procedure of balancing the electrodes is familiar to the expert who is well versed in the matter. It is also possible to achieve the lithium necessary for complete lithiation in the form of a separately added lithium-rich material, for example lithium metal powder or a lithium-rich metal alloy powder (for example a Li—Si or Li—Sn alloy). (F. Holtstiege, P. Bärmann, R. Nölle, M. Winter, T. Placke, Batteries 2018, 4, 4-39).

The invention is explained using the following examples:
Comparative Example:

The lithium nitrogen containing microcrystalline powdery anode materials $LiNH_2$ and $Li_2NH$, respectively, were mixed in an Ar-filled glove box with a transition metal free conductivity improver (carbon black AB 100) and PTFE powder (supplier Aldrich) and briefly homogenized by means of an agate mortar. The weight ratios were 60 wt % active material; 25 wt % carbon black; 15 wt % PTFE. The electrode material was then applied to a nickel net current collector with a surface area of 1 cm² and isostatically pressed for one minute at a pressure of 10 t.

The anode produced in this way was tested in a glass cell with a three-electrode arrangement. In addition to the lithium nitrogen containing electrode, two electrodes consisting of lithium sheets were used as counter and reference electrodes. The electrolyte used was an 11% LiPF$_6$ solution in EC/DMC (1:1).

The cell with LiNH$_2$ had a rest potential of 1300 mV, the cell with Li$_2$NH had one of 700 mV. In both cases polarization was performed with very low feed voltages up to a potential of 5 mV. The amount of charge consumed in each case was just under 0.1 eq lithium. The polarity was then reversed and lithium was removed. In the case of LiNH$_2$ only about 0.3 Li could be extracted, in the case of Li$_2$NH about 0.55 Li.

Example 1: Production of a Nitrogen and Transition Metal Containing Composite Anode Material by Grinding (Hydride Based Conductivity Improver)

In an Ar-filled glove box, 4.2 g lithium imide (Li$_2$NH) with a X-ray purity of 100%, 2.1 g zirconium hydride (grade S from Albemarle Germany, H content at least 1.9%) and 0.7 g carbon black (AB 100) were premixed in a beaker. The homogenized mixture was filled into a 50 mL zirconia ceramic grinding beaker together with about. 27 g 3 mm zirconia ceramic balls and sealed. The mixture was then ground in a planetary ball mill (Pulverisette P7 from Fritsch) for 90 minutes at 800 rpm.

The grinding bowl was put back into the Ar-filled glove box and opened there. The ground product was separated from the grinding media by sieving.

Yield: 6.3 g grey-black, fine powder.

Example 2: Production of a Nitrogen and Transition Metal Containing Composite Anode Material by Grinding (Nitride-Based Conductivity Improver)

In an Ar-filled glove box, 4.0 g lithium imide (Li$_2$NH) (X-ray purity 100%), 0.75 g titanium nitride (<3 μm from Sigma-Aldrich) and 0.25 g carbon black (AB 100) were mixed in a beaker. The prehomogenized mixture was filled into a 50 mL zirconia ceramic grinding beaker together with about 27 g 3 mm zirconia ceramic balls and sealed. The mixture was then ground in a planetary ball mill (Pulverisette P7 from Fritsch) for 240 minutes at 800 rpm in reverse operation mode.

The grinding bowl was put back into the Ar-filled glove box and opened there. The ground product was separated from the grinding media by sieving.

Yield: 4.1 g grey-black, fine powder.

The invention claimed is:

1. A rechargeable lithium battery with a composite anode comprising one or more metal nitrogen compound as the electrochemically active component in the composite anode, according to the general formula (I) and/or (II)

$$Li_xM^2_z(NH)_{0.5x+z} \quad (I)$$

$$Li_mM^2_n(NH_2)_{1+n} \quad (II), \text{ wherein}$$

(I) and (II) are present in any mixing ratio and
M² is an alkaline earth element selected from the group consisting of Mg, Ca, Sr, Ba, and any mixture thereof, with
x=0-4; z=0-2;
m=1 or 0; n=1 or 0, wherein (m+n)=1,
wherein general formulas (I) and (II) correspond to the fully discharged, lithium-poorest state of charge of the metallic nitrogen compounds;
a cathode separated from the anode by a separator, wherein the cathode contains lithium-insertable compounds selected from the group consisting of metal oxides, lithium metal oxides, lithium oxides and lithium hydroxide; and an aprotic lithium electrolyte;
characterized in that the metal nitrogen compounds of the composite anode are embedded in a transition metal-containing network that is purely electronically conductive or both ionic and electronically conductive, the network consisting of transition metals and/or electronically or mixed-conductive interstitial transition metal compounds, wherein the interstitial transition metal compounds have an electrochemical potential of <2.5 V against Li/Li⁺, and the weight ratio between the components forming the network and the metal nitrogen compounds is in the range of 1:100 to 1:2.

2. The lithium battery according to claim 1, characterized in that the transition metal-containing network contains finely divided, nanoparticulate transition metal powders selected from the group Sc, Ti, Zr, Hf, V, Cr, Mo, W, Mn, Fe, Co, Ni, Cu, Ag, Zn, La, Ce, Pr, Nd, Sm, Gd, Dy, Ho, Er, Tm, Yb, Lu and any combination of two or more of the foregoing.

3. The lithium battery according to claim 1, characterized in that the composite anode contains as transition metal powder the elements of the 3rd to 12th group of the periodic table of the elements.

4. The lithium battery according to claim 3, characterized in that the composite anode contains, as an electronically or mixed-conductive network containing transition metals, finely divided transition metal powders M wherein M is selected from the group consisting of Sc, Ti, Zr, Hf, V, Cr, Mo, W, Mn, Fe, Co, Ni, Cu, Ag, Zn, La, Ce, Pr, Nd, Sm, Gd, Dy, Ho, Er, Tm, Yb, Lu and any combination of two or more of the foregoing.

5. The lithium battery according to claim 1, characterized in that the composite anode contains electronically or mixed-conductive interstitial transition metal compounds selected from the group consisting of transition metal nitrides, transition metal carbides of at least one element of groups 3 to 12 of the periodic table of the elements, transition metal hydrides of at least one element of groups 3 to 10 of the periodic table of the elements, and any combination of two or more of the foregoing.

6. The lithium battery according to claim 5, characterized in that the composite anode contains at least one finely divided interstitial compound selected from the group consisting of (a) TiN$_n$, ZrNn, HfN$_n$, VN$_n$, NbN$_n$, TaN$_n$, CrN$_n$, MoN$_n$, WN$_n$, MnN$_n$, FeN$_n$, CoN$_n$, NiN$_n$, ZnN$_n$; Cr$_{1-n}$Fe$_n$N with n=0.3 to 1; (b) LizMnN$_4$; LiMoN$_2$; Li$_{2.6}$Co$_{0.2}$Cu$_{0.15}$Fe$_{0.05}$N; Li$_{2.7}$Fe$_{0.3}$N; LisFeN$_2$; Li$_{2.5}$Co$_{0.2}$Cu$_{0.1}$Ni$_{0.1}$N; Li$_{2.6}$Co$_{0.2}$Cu$_{0.2}$N; Li$_{2.6}$Co$_{0.4}$N; (c) ZrC$_{1-m}$, HfC$_{1-m}$, VC$_{1-m}$, NbC$_{1-m}$, TaC$_{1-m}$, Cr$_3$C$_2$, Mo$_2$C, Fe$_3$C with m=0 to 0.5; and (d) ScH$_o$, YH$_o$, LaHo, CeH$_2$, PrH$_o$, NdH$_o$, SmH$_o$, EuH$_o$, GdH$_o$, TbH$_o$, DyH$_o$, HoH$_o$, ErH$_o$, TmH$_o$, YbH$_o$, LuH$_o$, TiH$_2$, ZrH$_2$, HfH$_2$, VH, VH$_2$, TaH$_{0.5}$, MnH with o=2 or 3.

7. The lithium battery according to claim 1, characterized in that the transition metal powders and/or the mixed-conductive interstitial transition metal compounds and the electrochemically active metal nitrogen compounds are present homogeneously mixed in finely divided, amorphous or nanoparticulate form with particle sizes in the range from 0.1 to 100 nm.

8. The lithium battery according to claim 1, characterized in that the weight ratio between the transition metals and/or the electronically or mixed-conductive interstitial transition metal compounds and the nitrogen-containing active materials in the composite anode is in the range from 1:50 to 1:5.

9. The lithium battery according to claim 1, characterized in that the composite anode contains at least one electrochemically active material embedded in a matrix consisting of an electronically or mixed-conductive transition metal-containing material, wherein the at least one electrochemically active material is selected from the group consisting of $Li_2NH$, $MgNH$, $CaNH$, $Li_2Mg(NH)_2$, $Li_2Ca(NH)_2$, $MgCa(NH)_2$, $Li_4Mg(NH)_3$, $Li_2Mg_2(NH)_3$, and $LiNH_2$.

10. The lithium battery according to claim 1, characterized in that the composite anode contains non-metal-based conductivity improvers, lithium-donating additives and binders.

11. The lithium battery according to claim 1, characterized in that the composite anode is pressed or calendered.

12. The lithium battery according to claim 1, characterized in that the cathode comprises at least one anion redox active material in the form of a lithium oxygen compound selected from the group consisting of lithium hydroxide, lithium oxide, lithium peroxide and lithium superoxide, and lithium hydride.

13. The lithium battery according to claim 1, characterized in that the cathode is a layered structured material selected from the group consisting of $LiCoO_2$, $LiNiO_2$, $Li(Ni,Mn,Co)O_2$, $LiNi_{0.80}Co_{0.15}Al_{0.05}O_2$, a spinel structured material selected from the group consisting of $LiMn_2O_4$ and $LiNi_{0.5}Mn_{1.5}O_4$, an olivine structured material selected from the group consisting of $LifePO_4$ and $LiMnPO_4$, a non-lithiated metal insertion compound selected from the group consisting of electrolytic manganese dioxide or vanadium oxides, metal fluorides, and metalloxy fluorides.

14. The lithium battery according to claim 1, characterized in that the proportion by weight of the transition metal and/or interstitial transition metal compound in the anode is in the range of from 1 wt % to 33 wt %.

15. The lithium battery according to claim 1, characterized in that the transition metal powders and/or the mixed-conductive interstitial transition metal compounds and the electrochemically active metal nitrogen compounds are present homogeneously mixed in finely divided, amorphous or nanoparticulate form with particle sizes in the range from 1 to 30 nm.

* * * * *

UNITED STATES PATENT AND TRADEMARK OFFICE
CERTIFICATE OF CORRECTION

PATENT NO. : 12,176,518 B2
APPLICATION NO. : 17/272499
DATED : December 24, 2024
INVENTOR(S) : Wietelmann It is certified that error appears in the above-identified patent and that said Letters Patent is hereby corrected as shown below:

In the Claims

Column 12, Claim number 6, Line 50, please remove "(b) LizMnN$_4$;" and insert -- (b) Li$_7$MnN$_4$; --

Column 12, Claim number 6, Line 51, please remove "LisFeN$_2$;" and insert -- Li$_3$FeN$_2$; --

Column 14, Claim number 13, Line 4, please remove "LiNi$_{0.80}$Co$_{0.15}$Al$_{0.05}$0$_2$" and insert -- LiNi$_{0.80}$Co$_{0.15}$Al$_{0.05}$O$_2$ --

Column 14, Claim number 13, Line 7, please remove "LifePO$_4$" and insert -- LiFePO$_4$ --

Signed and Sealed this
Twenty-seventh Day of May, 2025

Coke Morgan Stewart
*Acting Director of the United States Patent and Trademark Office*